(12) United States Patent
Uemura et al.

(10) Patent No.: US 10,518,637 B2
(45) Date of Patent: Dec. 31, 2019

(54) CRAWLER BELT-TYPE TRACTOR

(71) Applicant: KOMATSU LTD., Tokyo (JP)

(72) Inventors: Takuya Uemura, Tokyo (JP); Tomoaki Tsuji, Tokyo (JP); Taira Ozaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 218 days.

(21) Appl. No.: 15/557,905

(22) PCT Filed: Oct. 20, 2016

(86) PCT No.: PCT/JP2016/081175
§ 371 (c)(1),
(2) Date: Sep. 13, 2017

(87) PCT Pub. No.: WO2017/069218
PCT Pub. Date: Apr. 27, 2017

(65) Prior Publication Data
US 2018/0050588 A1    Feb. 22, 2018

(30) Foreign Application Priority Data
Oct. 23, 2015  (JP) ................. 2015-208831

(51) Int. Cl.
*B60K 15/063*     (2006.01)
*B62D 55/06*      (2006.01)
(Continued)

(52) U.S. Cl.
CPC ............ *B60K 15/063* (2013.01); *B62D 55/06* (2013.01); *E02F 3/815* (2013.01); *E02F 9/26* (2013.01); *E02F 5/32* (2013.01)

(58) Field of Classification Search
CPC ...... B60K 15/063; B60K 15/03; B60K 15/00; B60K 2015/0638; B62D 55/06; B62D 55/00; E02F 3/7609; E02F 3/76; E02F 3/04; E02F 3/00; E02F 3/815; E02F 3/80; E02F 9/0883; E02F 9/0858; E02F 9/08; E02F 9/00; E02F 9/205; E02F 9/2025;
(Continued)

(56) References Cited

U.S. PATENT DOCUMENTS

| 3,956,835 A | 5/1976 | Evenson |
| 2013/0289842 A1 | 10/2013 | Dabbs |
| 2014/0239625 A1 | 8/2014 | Ozaki et al. |

FOREIGN PATENT DOCUMENTS

| JP | 49-21784 Y1 | 6/1974 |
| JP | 51-24721 Y1 | 6/1976 |

(Continued)

OTHER PUBLICATIONS

The International Search Report for the corresponding international application No. PCT/JP2016/081175, dated Nov. 29, 2016.

*Primary Examiner* — Christopher J. Novosad
(74) *Attorney, Agent, or Firm* — Global IP Counselors, LLP

(57) ABSTRACT

A crawler belt-type tractor includes a vehicle body, a travel device, an engine, and a fuel tank. The travel device is attached to the vehicle body. The travel device includes a crawler belt. The engine generates driving power for driving the travel device. The fuel tank is disposed in a rear portion of the vehicle body. The fuel tank stores fuel for the engine. The rear end of the fuel tank is positioned rearward of the rear end of the crawler belt.

16 Claims, 7 Drawing Sheets

(51) Int. Cl.
*E02F 9/26* (2006.01)
*E02F 3/815* (2006.01)
*E02F 5/32* (2006.01)

(58) Field of Classification Search
CPC ....... E02F 9/20; E02F 9/26; E02F 5/32; E02F 5/30; E02F 5/00
See application file for complete search history.

(56) References Cited

FOREIGN PATENT DOCUMENTS

| | | |
|---|---|---|
| JP | 51-115002 A | 10/1976 |
| JP | 60-139854 U | 9/1985 |
| JP | 3-25652 U | 3/1991 |
| JP | 7-113251 A | 5/1995 |
| JP | 11-217853 A | 8/1999 |
| JP | 2009-35194 A | 2/2009 |
| WO | 2014128919 A1 | 8/2014 |

CRAWLER BELT-TYPE TRACTOR

CROSS-REFERENCE TO RELATED APPLICATIONS

This application is a U.S. National stage application of International Application No. PCT/JP2016/081175, filed on Oct. 20, 2016. This U.S. National stage application claims priority under 35 U.S.C. § 119(a) to Japanese Patent Application No. 2015-208831, filed in Japan on Oct. 23, 2015, the entire contents of which are hereby incorporated herein by reference.

BACKGROUND

Field of Invention

The present invention relates to a crawler belt-type tractor to which a work implement can be attached.

Description of the Related Art

Generally, the engine is attached to the vehicle front side and the fuel tank is attached to the vehicle rear side of a tractor such as a bulldozer and the like (see Japanese Unexamined Patent Application Publication No. 2009-35194). In this type of tractor, the rear end of the fuel tank is disposed so as to be positioned forward of the rear end of the crawler belt.

SUMMARY

A bulldozer is known as a typical vehicle in which a work implement is attached to crawler belt-type tractor. An excavating blade is attached to the vehicle front side and a ripper device is attached to the vehicle rear side as work implements in a bulldozer. During work with the excavating blade, it is advantageous for the work that the position of the center of gravity of the vehicle is a position forward of the center in the front-back direction of the vehicle. However, during work with the ripper device, it is advantageous for the work that the position of the center of gravity is a position further toward the rear side than the center in the front-back direction of the vehicle. Because heavy objects such as the engine and the like are actually disposed on the vehicle front side in a tractor, the center of gravity is skewed too far toward the front side from the point of view of ripping work.

In order to address this problem, the present description discloses a crawler belt-type tractor with a good vehicle balance when work implements are attached to the vehicle front and rear.

A crawler belt-type tractor according to a first aspect of the present invention includes a vehicle body, a travel device, an engine, and a fuel tank. The travel device is attached to the vehicle body. The travel device includes a crawler belt. The engine generates driving power for driving the travel device. The fuel tank is disposed in a rear portion of the vehicle body. The fuel tank stores fuel for the engine. The rear end of the fuel tank is positioned rearward of the rear end of the crawler belt.

The crawler belt-type tractor may further include a first hydraulic cylinder attachment portion to which a first hydraulic cylinder can be attached. The first hydraulic cylinder attachment portion may overlap the fuel tank as seen from above. Moreover, the first hydraulic cylinder attachment portion may overlap the fuel tank as seen from the side.

The crawler belt-type tractor may further include a second hydraulic cylinder attachment portion to which a second hydraulic cylinder can be attached. The second hydraulic cylinder attachment portion may overlap the fuel tank as seen from above. Moreover, the second hydraulic cylinder attachment portion may overlap the fuel tank as seen from the side.

The crawler belt-type tractor may further include a third hydraulic cylinder attachment portion to which a third hydraulic cylinder can be attached. The second hydraulic cylinder attachment portion and the third hydraulic cylinder attachment portion may be disposed in positions symmetrical to the center axial line of the first hydraulic cylinder as seen from above. The third hydraulic cylinder attachment portion may overlap the fuel tank as seen from above. Moreover, the third hydraulic cylinder attachment portion may overlap the fuel tank as seen from the side.

The first hydraulic cylinder attachment portion may be positioned forward of the second hydraulic cylinder attachment portion.

The crawler belt-type tractor may further include a ripper device attached to the rear side of the vehicle body. The ripper device may have the first hydraulic cylinder for lifting actions and the second and third hydraulic cylinders for tilting actions.

The fuel tank may include a first recessed portion which is a portion cut out for the range of movement of the first hydraulic cylinder. The degree of recession of the first recessed portion may become larger further toward the rear.

The fuel tank may include a second recessed portion which is a portion cut out for the range of movement of the second hydraulic cylinder. The degree of recession of the second recessed portion may become larger further toward the rear.

The fuel tank may include a third recessed portion which is a portion cut out for the range of movement of the third hydraulic cylinder. The degree of recession of the third recessed portion may become larger further toward the rear.

The first recessed portion may be provided in the center in the left-right direction of the fuel tank. The second recessed portion and the third recessed portion may be provided adjacent to the first recessed portion. The fuel tank may further include a first downward protruding portion and a second downward protruding portion. The first downward protruding portion may be positioned outward of the second recessed portion and may protrude downward from the second recessed portion. The second downward protruding portion may be positioned outward of the third recessed portion and may protrude downward from the third recessed portion.

The crawler belt-type tractor may further include a ripper imaging unit that is configured to capture an image of a work position of the ripper. The ripper imaging unit may be provided on the rear side of the vehicle body.

The ripper imaging unit may be positioned further below at least one of the first hydraulic cylinder attachment portion, the second hydraulic cylinder attachment portion, and the third hydraulic cylinder attachment portion.

The fuel tank may have a shape that extends from one end to the other end in the vehicle width direction of the vehicle body.

The crawler belt-type tractor may further include an excavating blade on the front side of the engine.

Effects of Invention

In the crawler belt-type tractor according to the first aspect, the rear end of the fuel tank is positioned rearward of the rear end of the crawler belt. Therefore, there is provided a crawler belt-type tractor with a good vehicle balance when work implements are attached to the vehicle front and rear.

DETAILED DESCRIPTION OF EMBODIMENT(S)

Figure 1:
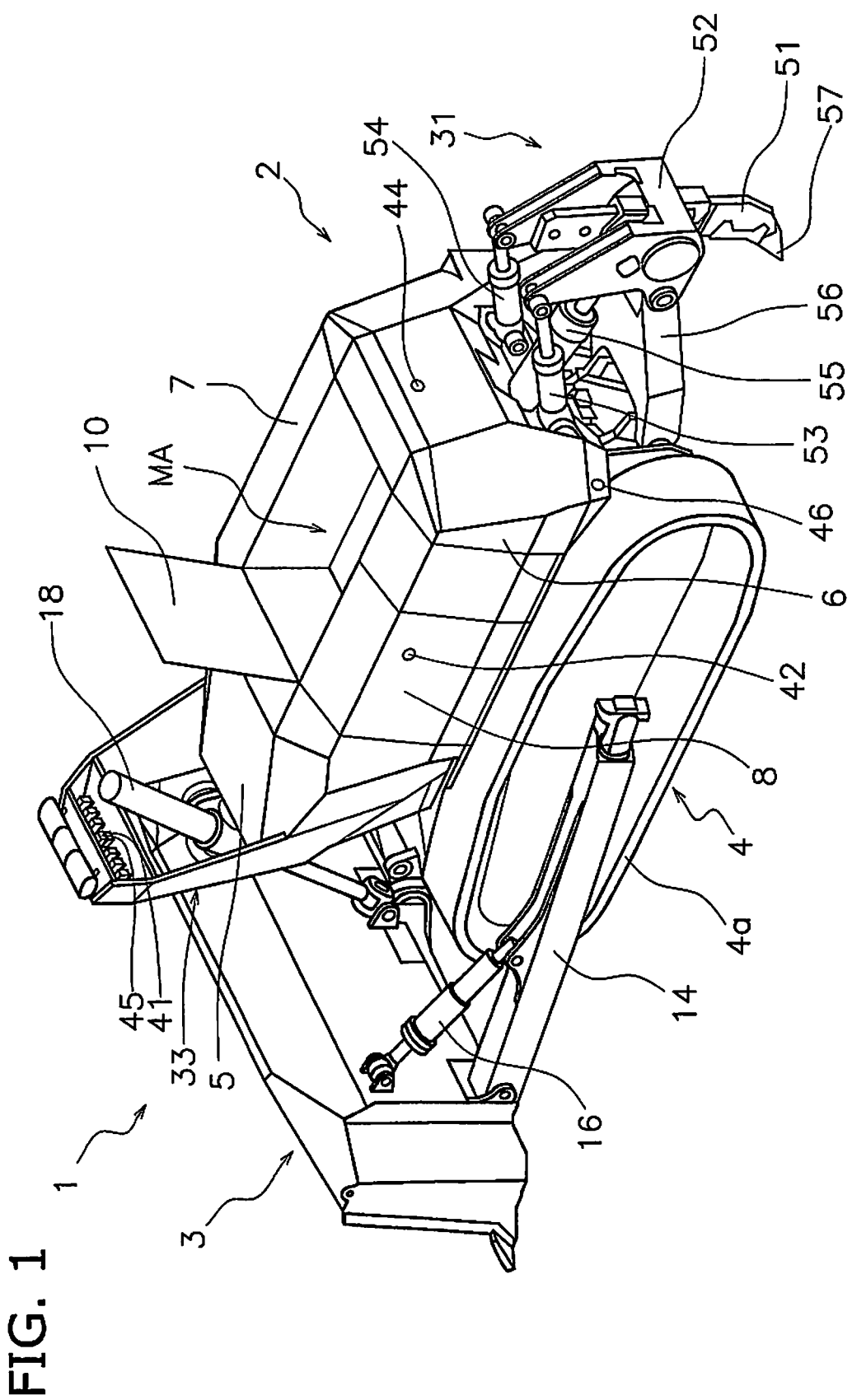
FIG. 1 is a perspective view of a work vehicle according to an embodiment.
Figure 2:
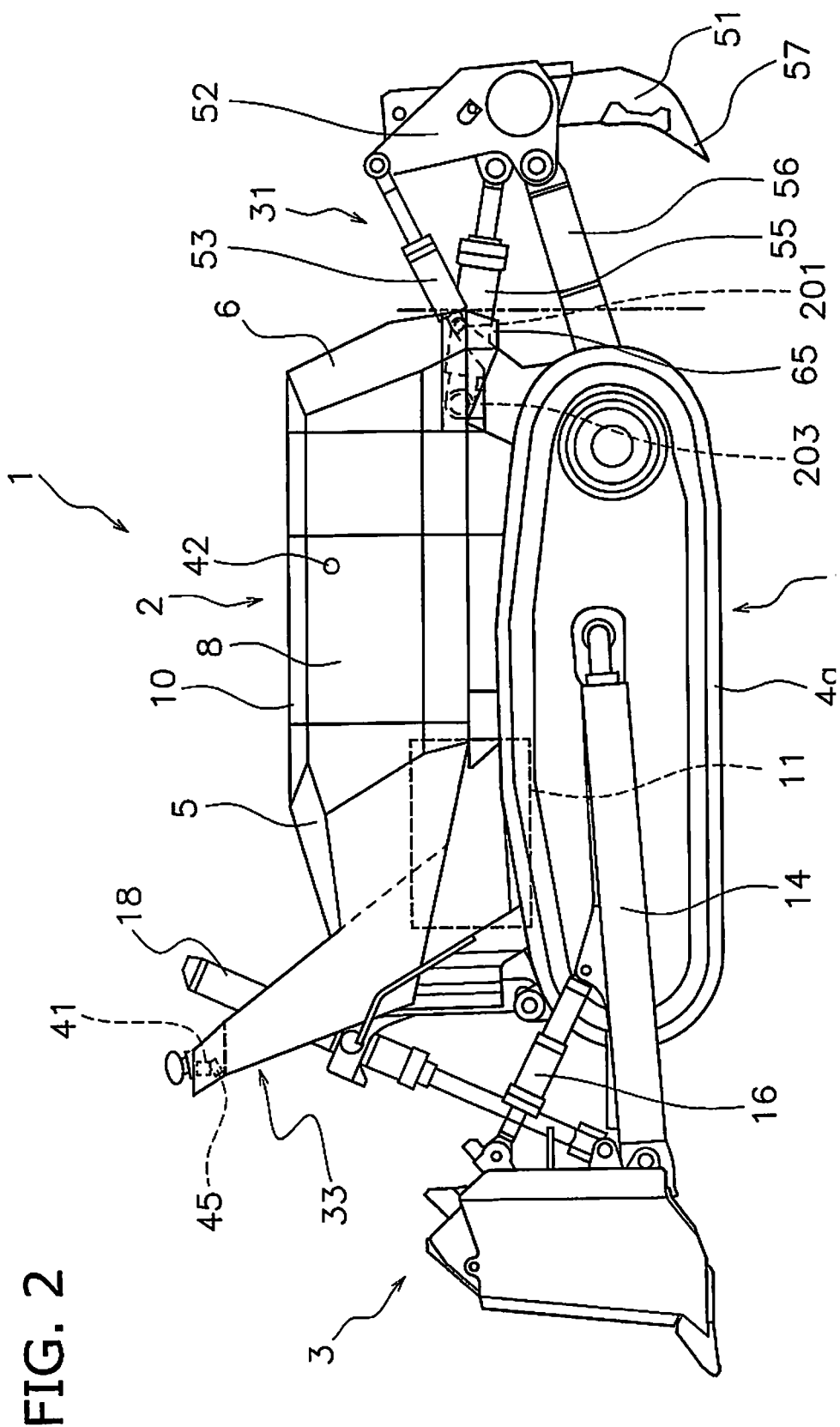
FIG. 2 is side view of the work vehicle.
Figure 3:
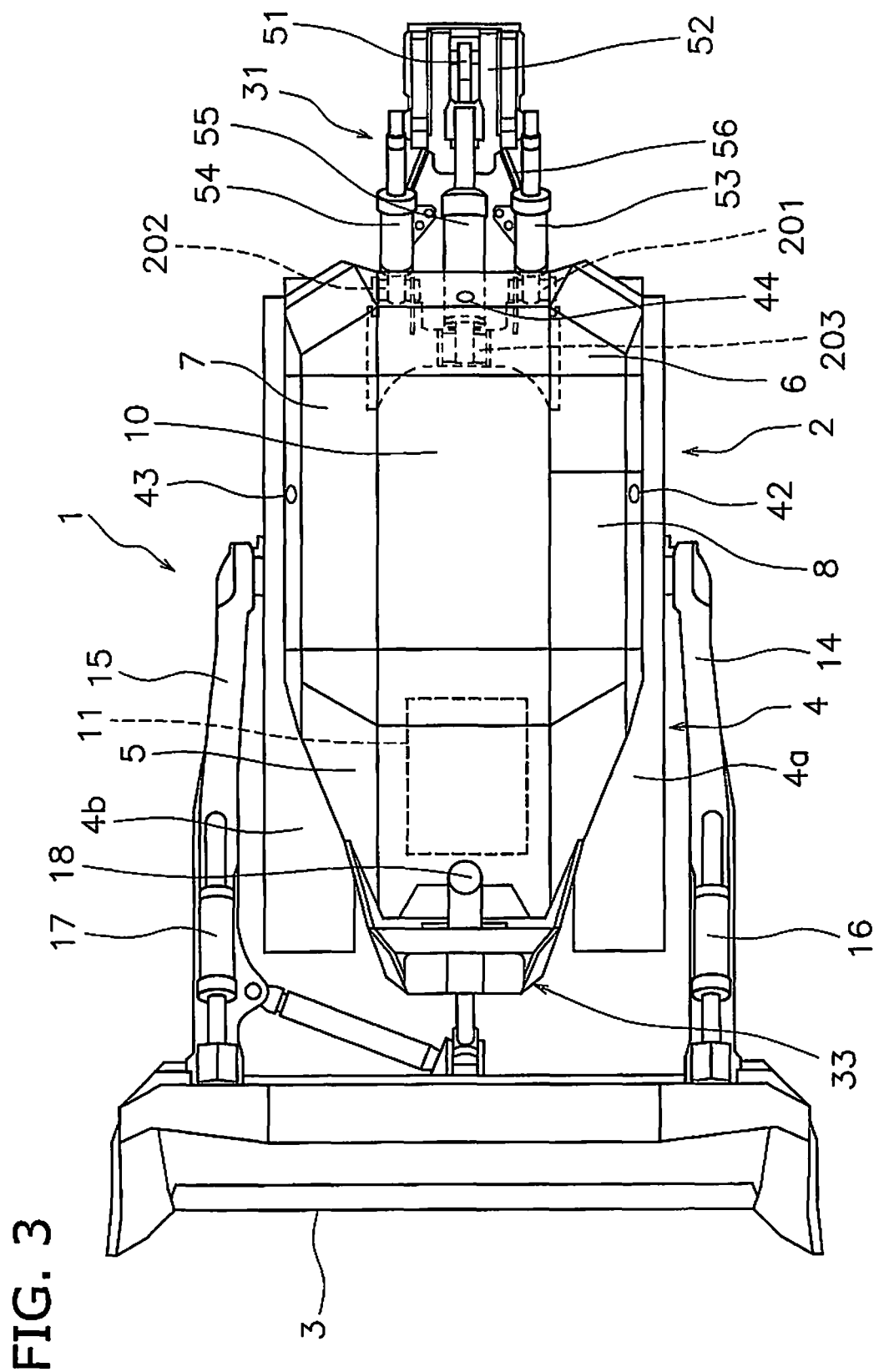
FIG. 3 is plan view of the work vehicle.
Figure 4:
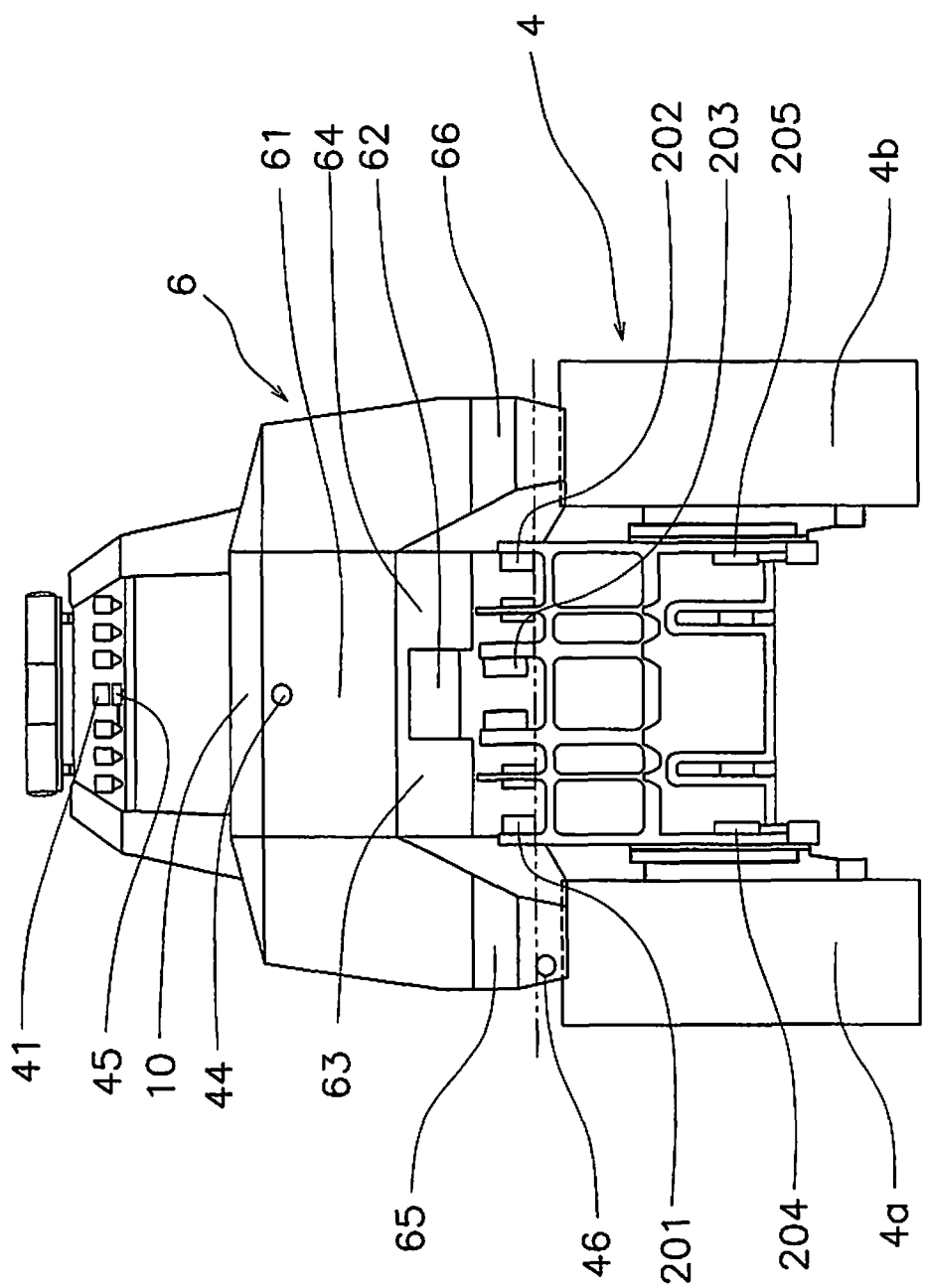
FIG. 4 is a back surface view of the crawler belt-type tractor.
Figure 7:
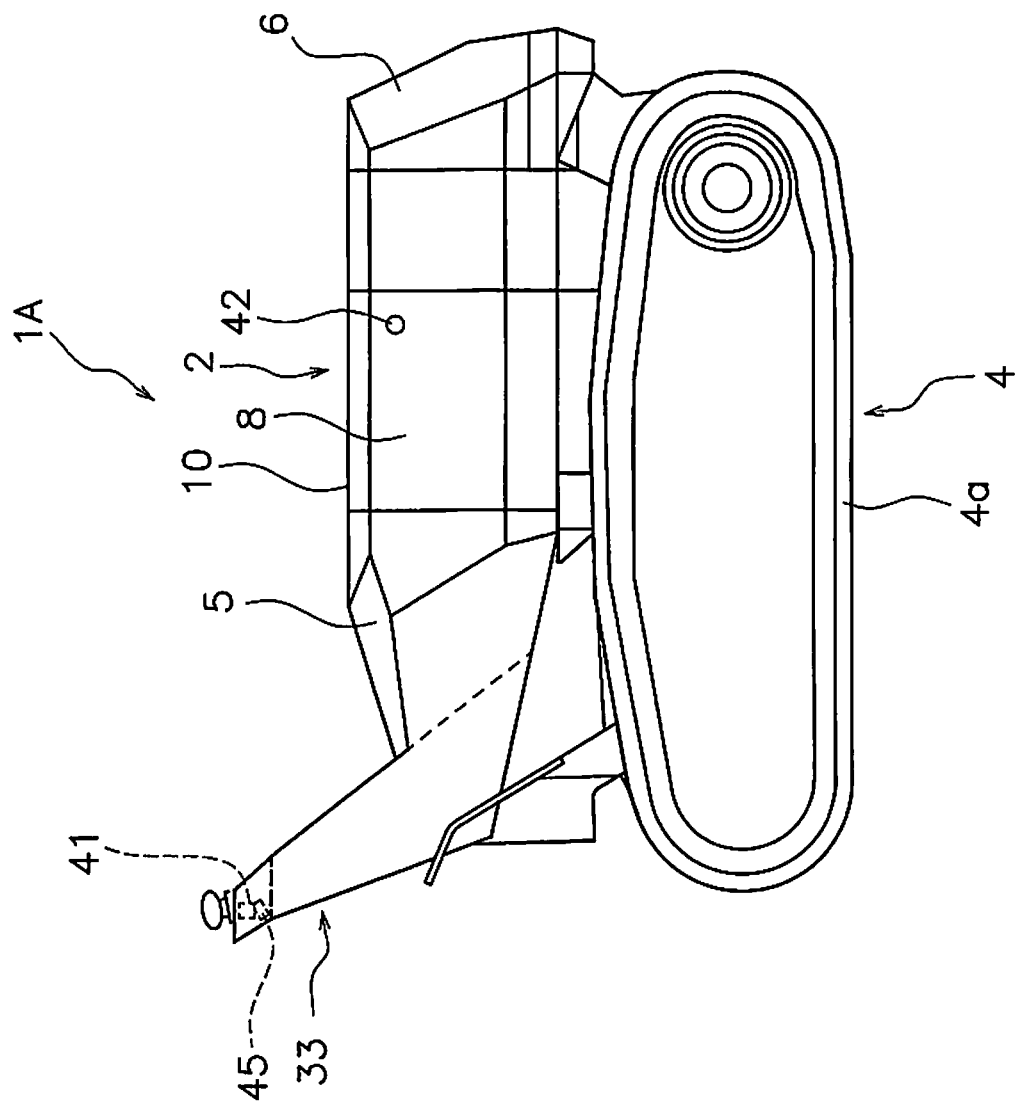
FIG. 7 is a side view of the crawler belt-type tractor.

The following is an explanation of a work vehicle 1 according to an embodiment with reference to the drawings. FIG. 1 is a perspective view of the work vehicle 1 according to the present embodiment. FIG. 2 is a side view of the work vehicle 1. FIG. 3 is a plan view of the work vehicle 1. The work vehicle 1 is a bulldozer according to the present embodiment. The work vehicle 1 is a vehicle that does not include an operator cab in the present embodiment. As discussed below, the work vehicle 1 can be operated remotely. The work vehicle 1 includes a vehicle body 2, a work implement 3, and a ripper device 31. In the present embodiment, the work vehicle 1 with the work implement 3 and the ripper device 31 removed is referred to as a crawler belt-type tractor 1A. FIG. 4 is a back surface view of the crawler belt-type tractor 1A. FIG. 7 is a side view of the crawler belt-type tractor 1A.

The vehicle body 2 includes a travel device 4 and an engine compartment 5. The travel device 4 is a device for causing the work vehicle 1 to travel. The travel device 4 is mounted on the left and right side portions of the vehicle body 2. The travel device 4 includes crawler belts 4a and 4b. The crawler belt 4a is mounted on the left side portion of the vehicle body 2. The crawler belt 4b is mounted on the right side portion of the vehicle body 2. The work vehicle 1 travels due to the crawler belts 4a and 4b being driven.

Toward the rear in the present embodiment signifies the direction in which the ripper device 31 is disposed with regard to the vehicle body 2 when the ripper device 31 is attached to the vehicle body 2, and toward the front signifies the opposite direction. Left and right signify the left and right directions when facing toward the aforementioned front. The left-right direction may be paraphrased as the vehicle width direction.

The engine compartment 5 is disposed in the front portion of the vehicle body 2. An engine 11 that generates driving power for driving the travel device 4 is disposed inside the engine compartment 5.

The vehicle body 2 includes a rear housing portion 6, a right housing portion 7, and a left housing portion 8. The engine compartment 5, the rear housing portion 6, the right housing portion 7, and the left housing portion 8 are disposed so as to surround a maintenance area MA as illustrated in FIG. 1. The engine compartment 5 is disposed in front of the maintenance area MA. The rear housing portion 6 is disposed behind the maintenance area MA. The right housing portion 7 is disposed to the right of the maintenance area MA. The left housing portion 8 is disposed to the left of the maintenance area MA.

The rear housing portion 6 is a fuel tank that stores fuel for the engine 11. The rear housing portion 6 is disposed in the rear portion of the vehicle body 2. The rear end (depicted with the chain double-dashed line in FIG. 2) of the rear housing portion 6 is positioned rearward of the rear ends of the crawler belts 4a and 4b. The rear housing portion 6 has a shape that extends from one end to the other end in the vehicle width direction of the vehicle body 2. The fuel tank is positioned at the rear end of the vehicle body 2 and has a shape that extends from one end to the other end in the vehicle width direction. A cooling device such as a radiator is disposed in the right housing portion 7. A hydraulic fluid tank is disposed in the left housing portion 8. However, the items housed in the housing portions 7 and 8 are not limited to the above items and may be changed.

A lid member 10 is disposed above the maintenance area MA. The lid member 10 is disposed so as to be able to open and close the maintenance area MA. The lid member 10 is depicted as open in FIG. 1 and the lid member 10 is depicted as closed in FIGS. 2 to 4.

Doors (not illustrated) for opening and closing the engine compartment 5 and the housing portion 7 are provided facing the maintenance area MA on the engine compartment 5 and on the housing portion 7. A worker is able to access the inside of the engine compartment 5 and the inside of the housing portion 7 from the maintenance area MA by opening the door on the engine compartment 5 or on the housing portion 7.

The work implement 3 is disposed in front of the vehicle body 2. The work implement 3 is disposed in front of the engine compartment 5. In the present embodiment, the work implement 3 is an excavating blade. The work implement 3 is supported by a left arm 14 and a right arm 15. The left arm 14 is mounted on the left side portion of the vehicle body 2. The right arm 15 is mounted on the right side portion of the vehicle body 2.

A left tilt cylinder 16, a right tilt cylinder 17, and a lift cylinder 18 are attached to the work implement 3. The left tilt cylinder 16 is attached to the left side portion of the vehicle body 2. The right tilt cylinder 17 is attached to the right side portion of the vehicle body 2. The left tilt cylinder 16 and the right tilt cylinder 17 are driven by hydraulic fluid from a hydraulic pump 12 (see FIG. 6). The left tilt cylinder 16 and the right tilt cylinder 17 cause the work implement 3 to move to the left or right.

The lift cylinder 18 is attached to the center portion of the vehicle body 2 in the vehicle width direction. Only one lift cylinder 18 is provided in the work vehicle 1. The lift cylinder 18 is disposed in front of the engine compartment 5. The lift cylinder 18 is disposed behind the work implement 3. The lift cylinder 18 is driven by hydraulic fluid from the hydraulic pump 12. The lift cylinder 18 causes the work implement 3 to move up and down.

The ripper device 31 is disposed on the rear side of the vehicle body 2. The ripper device 31 is attached to a rear portion of the vehicle body 2. The ripper device 31 includes a shank 51, a ripper supporting member 52, a first tilt cylinder 53, a second tilt cylinder 54, a lift cylinder 55, and an arm 56.

The shank 51 extends in the up-down direction and the lower end portion of the shank 51 is curved toward the front. A ripper point 57 is attached to the lower end portion of the shank 51. The ripper supporting member 52 supports the shank 51. The ripper supporting member 52 is a beam that extends in the up-down direction. The shank 51 protrudes downward from the ripper supporting member 52. The first tilt cylinder 53 is rotatably attached to the ripper supporting member 52. The second tilt cylinder 54 is rotatably attached to the ripper supporting member 52. The lift cylinder 55 is rotatably attached to the ripper supporting member 52. The arm 56 is rotatably attached to the ripper supporting member 52.

The first tilt cylinder 53 and the second tilt cylinder 54 move the ripper device 31. Specifically, the first tilt cylinder 53 and the second tilt cylinder 54 are actuators for rotating the shank 51 and performing a tilting action of tilting the ripper point 57 forward and rearward. The first tilt cylinder 53 and the second tilt cylinder 54 are disposed away from each other in the vehicle width direction. As illustrated in FIG. 2, the first tilt cylinder 53 and the second tilt cylinder 54 are inclined rearward and upward from the rear end (rear end of the vehicle body frame) of the vehicle body 2. As illustrated in FIG. 3, the first tilt cylinder 53 and the second tilt cylinder 54 extend in the vehicle front-back direction as seen from above.

The rear portion of the vehicle body 2 includes a first tilt cylinder attachment portion 201 (referred to below as first TC attachment portion 201) and a second tilt cylinder attachment portion 202 (referred to below as second TC attachment portion 202). The first tilt cylinder 53 is rotatably attached to the first TC attachment portion 201. The second tilt cylinder 54 is rotatably attached to the second TC attachment portion 202. As illustrated in FIG. 2, the first TC attachment portion 201 and the second TC attachment portion 202 overlap the fuel tank 6 as seen from the side. As illustrated in FIG. 3, the first TC attachment portion 201 and the second TC attachment portion 202 overlap the fuel tank 6 as seen from above.

The lift cylinder 55 moves the ripper device 31. Specifically, the lift cylinder 55 raises and lowers the shank 51 and the ripper supporting member 52. The lift cylinder 55 is an actuator for performing a lifting action of raising and lowering the ripper point 57. The lift cylinder 55 is attached to the center portion of the vehicle body 2 in the vehicle width direction. The lift cylinder 55 is disposed between the first tilt cylinder 53 and the second tilt cylinder 54 as seen from above. The lift cylinder 55 is disposed on an extension line of the center line in the vehicle width direction of the vehicle body 2 and extends in the vehicle front-back direction. The lift cylinder 55 extends and contracts in the front-back direction as seen from above.

The rear portion of the vehicle body 2 includes a lift cylinder attachment portion 203 (referred to below as LC attachment portion 203). The lift cylinder 55 is rotatably attached to the LC attachment portion 203. The LC attachment portion 203 is positioned between the first TC attachment portion 201 and the second TC attachment portion 202 in the vehicle width direction. The first TC attachment portion 201 and the second TC attachment portion 202 are disposed symmetrically with respect to the center axis of the lift cylinder 55 as seen from above. The LC attachment portion 203 is positioned forward of the first TC attachment portion 201 and the second TC attachment portion 202. As illustrated in FIG. 2, the LC attachment portion 203 overlaps the fuel tank 6 as seen from the side. As illustrated in FIG. 3, the LC attachment portion 203 overlaps the fuel tank 6 as seen from above.

The arm 56 rotatably supports the shank 51 and the ripper supporting member 52. The arm 56 is disposed below the lift cylinder 55. As illustrated in FIG. 4, the rear portion of the vehicle body 2 includes a first arm attachment portion 204 and a second arm attachment portion 205. The arm 56 is rotatably attached with the first arm attachment portion 204 and the second arm attachment portion 205. The first arm attachment portion 204 and the second arm attachment portion 205 are positioned lower than the upper surface of the crawler belts 4a and 4b. The first arm attachment portion 204 and the second arm attachment portion 205 are positioned laterally inward of the crawler belts 4a and 4b. The first arm attachment portion 204 and the second arm attachment portion 205 are positioned lower than the first TC attachment portion 201, the second TC attachment portion 202, and the LC attachment portion 203.

The ripper device explained above performs the tilting action and the lifting action. The tilt cylinders 53 and 54 extend and the lift cylinder 55 does not extend or contract so that the length of the lift cylinder 55 is fixed in the tilting action. As a result, the lift cylinder 55 and the arm 56 rotate and the shank 51 is inclined while the tip end portion of the lift cylinder 55 and the tip end portion of the arm 56 rise upward.

The lift cylinder 55 contracts and the tilt cylinders 53 and 54 do not extend or contract so that the lengths of the tilt cylinders 53 and 54 are fixed in the lifting action. As a result, the ripper supporting member 52 is pulled toward the vehicle body side and the tilt cylinders 53 and 54 and the arm 56 rotate so that the tip end portions of the tilt cylinders 53 and 54 and the tip end portion of the arm 56 rise upward. Consequently, the ripper supporting member 52 and the shank 51 rise upward.

Figure 5:
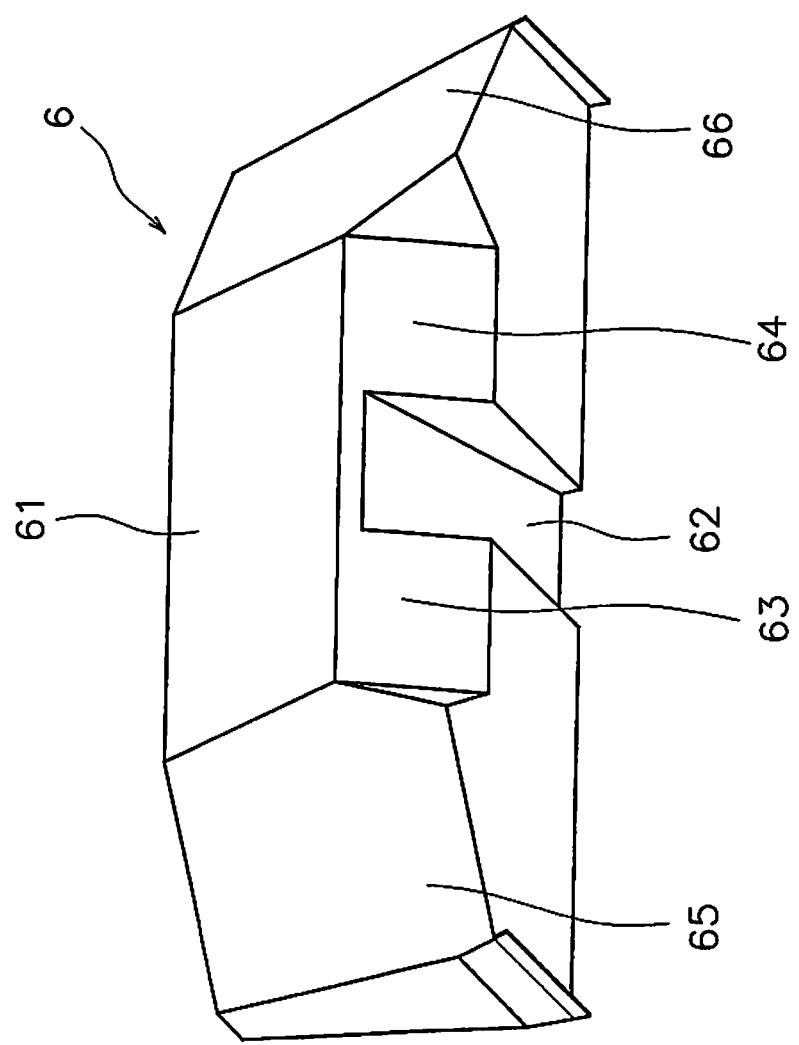
FIG. 5 is a perspective view of a fuel tank.

FIG. 5 is a perspective view of the fuel tank 6 as seen from below. As illustrated in FIGS. 4 and 5, the fuel tank 6 includes a tank upper portion 61, a first recessed portion 62, a second recessed portion 63, a third recessed portion 64, a first downward protruding portion 65, and a second downward protruding portion 66. The tank upper portion 61 extends from the crawler belt 4a to the crawler belt 4b in the vehicle width direction. The tank upper portion 61 extends from one end to the other end in the vehicle width direction of the vehicle body 2. The rear surface of the tank upper portion 61 is inclined rearward and upward.

The first recessed portion 62 is a portion cut out for the range of movement of the lift cylinder 55. The first recessed portion 62 is recessed upward. The first recessed portion 62 is provided in the center in the left-right direction of the fuel tank 6. The degree of recession upward of the first recessed portion 62 increases further toward the rear.

The second recessed portion 63 is a portion cut out for the range of movement of the first tilt cylinder 53. The second recessed portion 63 is recessed upward. The second recessed portion 63 is provided to the left and adjacent to the first recessed portion 62. The degree of recession upward of the second recessed portion 63 increases further toward the rear.

The third recessed portion 64 is a portion cut out for the range of movement of the second tilt cylinder 54. The third recessed portion 64 is recessed upward. The third recessed portion 64 is provided to the right and adjacent to the first recessed portion 62. The degree of recession of the third recessed portion 64 increases further toward the rear.

The first downward protruding portion 65 protrudes downward from the left edge portion of the tank upper portion 61. The first downward protruding portion 65 is positioned further to the outside than the second recessed portion 63 and protrudes downward from the second recessed portion 63. The second downward protruding portion 66 protrudes downward from the right edge portion of the tank upper portion 61. The second downward protruding portion 66 is positioned further to the outside than the third recessed portion 64 and protrudes downward from the third recessed portion 64. The first downward protruding portion 65 and the second downward protruding portion 66 exhibit left-right symmetry. As illustrated in FIG. 2, the first TC attachment portion 201, the second TC attachment portion 202, and the LC attachment portion 203 overlap the first downward protruding portion 65 and the second downward protruding portion 66 as seen from the side.

Figure 6:
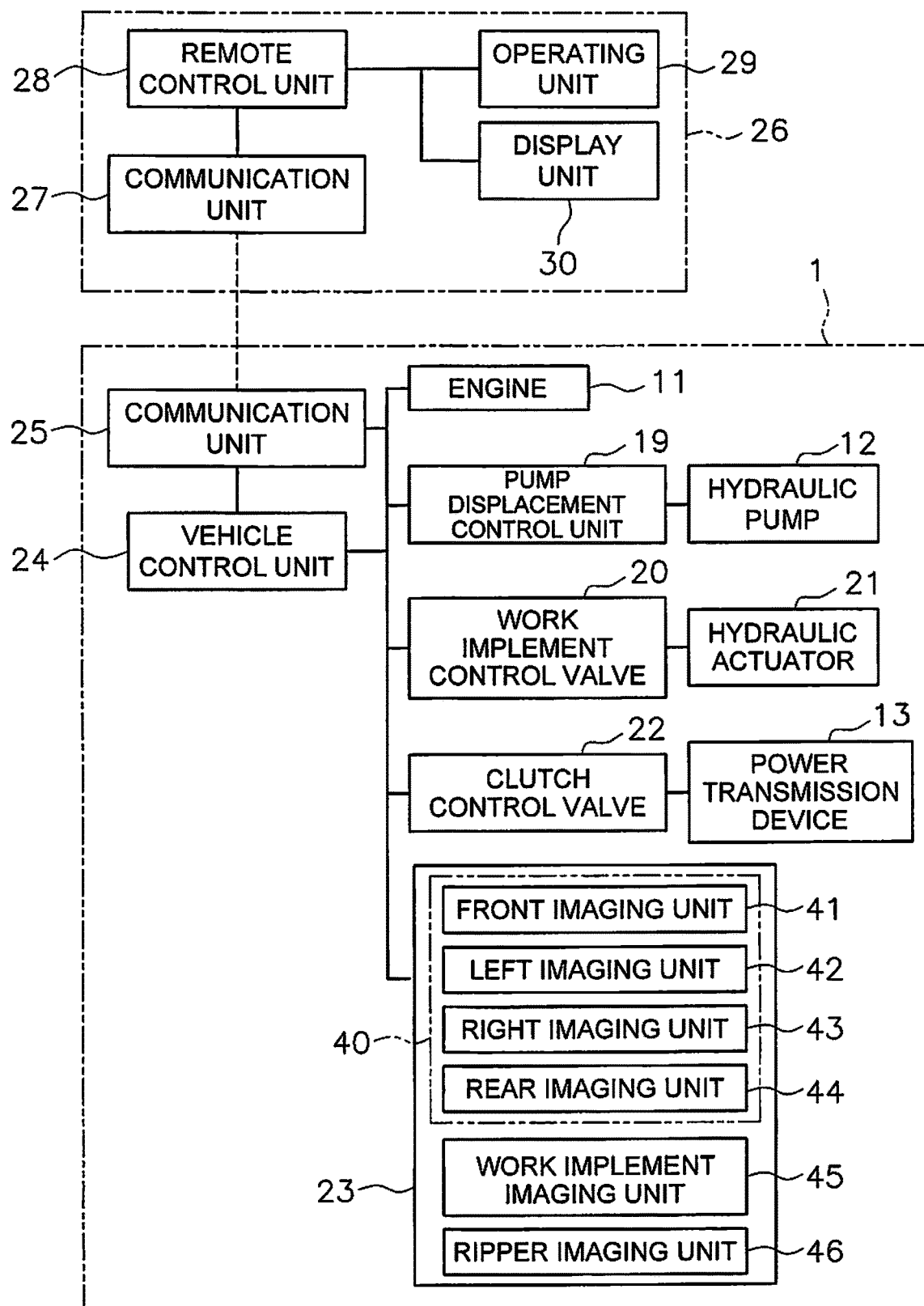
FIG. 6 is a block diagram of a control system of the work vehicle.

FIG. 6 is a block diagram of a control system of the work vehicle 1. As illustrated in FIG. 6, the work vehicle 1 includes the hydraulic pump 12 and a pump displacement control unit 19. The hydraulic pump 12 is driven by the engine 11 to discharge the hydraulic fluid. The hydraulic pump 12 is a variable displacement pump and the pump displacement control unit 19 controls the discharge displacement of the hydraulic pump 12.

The work vehicle 1 includes a work implement control valve 20 and a hydraulic actuator 21. The hydraulic actuator 21 is driven by hydraulic fluid discharged from the hydraulic pump 12. For example, the hydraulic actuator 21 includes the abovementioned lift cylinder 18 and the left and right tilt cylinders 16 and 17 of the work implement 3. Further, the hydraulic actuator 21 includes the lift cylinder 55 and the first and second tilt cylinders 53 and 54 of the ripper device 31. The work implement control valve 20 controls the supply and discharge of the hydraulic fluid to and from the hydraulic actuator 21.

The work vehicle 1 includes a power transmission device 13 and a clutch control valve 22. The power transmission device 13 includes, for example, a transmission and a torque converter. The clutch control valve 22 controls the switching of a speed change clutch, a forward/reverse clutch, and a steering clutch and the like included in the power transmission device 13.

The work vehicle 1 includes an imaging unit 23. The imaging unit 23 acquires images of the surroundings of the work vehicle 1. The imaging unit 23 includes a surroundings imaging unit 40, a work implement imaging unit 45, and a ripper imaging unit 46. The surroundings imaging unit 40 captures images of the surroundings of the vehicle body 2. That is, the surroundings imaging unit 40 captures images of the regions in the front and back and left and right of the vehicle body 2.

Specifically, the surroundings imaging unit 40 includes a front imaging unit 41, a left imaging unit 42, a right imaging unit 43, and a rear imaging unit 44. As illustrated in FIG. 2, the front imaging unit 41 is attached to a supporting member 33. The supporting member 33 is attached to a front portion of the vehicle body 2. The supporting member 33 is attached to a middle portion of the vehicle body 2 in the vehicle width direction. The front imaging unit 41 captures images in front of the vehicle body 2.

The left imaging unit 42 is attached to a left side portion of the vehicle body 2. The left imaging unit 42 captures images to the left of the vehicle body 2. As illustrated in FIG. 3, the right imaging unit 43 is attached to a right side portion of the vehicle body 2. The right imaging unit 43 captures images to the right of the vehicle body 2. The rear imaging unit 44 is attached to a rear portion of the vehicle body 2. The rear imaging unit 44 captures images to the rear of the vehicle body 2.

The work implement imaging unit 45 captures images of the region in front of the work implement 3 and of the work implement 3. The work implement imaging unit 45 is disposed above the work implement 3. Specifically, the work implement imaging unit 45 is disposed higher than the upper end of the work implement 3. As illustrated in FIGS. 1 and 2, the work implement imaging unit 45 and the front imaging unit 41 are supported by the supporting member 33. The work implement imaging unit 45 is in vertical alignment with the front imaging unit 41. Specifically, the work implement imaging unit 45 is disposed directly above the supporting member 33 and the front imaging unit 41 is disposed directly above the work implement imaging unit 45.

The ripper imaging unit 46 is able to capture images of work positions of the ripper device 31. Specifically, the ripper imaging unit 46 is able to capture images of the ripper point 57 and the region surrounding the ripper point 57. As illustrated in FIG. 4, the ripper imaging unit 46 is disposed below the fuel tank 6. In the example in FIG. 4, the ripper imaging unit 46 is attached to the rear side of the vehicle body 2 below the first downward protruding portion 65. The ripper imaging unit 46 is disposed lower than the rear imaging unit 44. In FIG. 4, the upper end of the ripper imaging unit 46 is depicted with the chain double-dashed line. As can be seen, the ripper imaging unit 46 is positioned below at least one of the LC attachment portions 203. That is, the ripper imaging unit 46 is positioned lower than at least one of the first TC attachment portion 201, the second TC attachment portion 202, and the LC attachment portion 203.

The ripper imaging unit 46 is disposed higher than the first arm attachment portion 204 and the second arm attachment portion 205. The ripper imaging unit 46 is disposed laterally outward of the first arm attachment portion 204 and the second arm attachment portion 205. The crawler belt 4a is positioned below the ripper imaging unit 46. The arm 56 is formed so as to not overlap an imaginary straight line connecting the ripper imaging unit 46 and the lower end portion of the shank 51. As a result, the ripper imaging unit 46 is able to capture images of the lower end portion of the shank 51 positioned lower than the arm 56 and the region surrounding the lower end portion of the shank 51, from a position higher than the arm 56.

The ripper imaging unit 46 may be disposed below the second downward protruding portion 66. In this case, the arm 56 may be formed so as to not overlap an imaginary straight line connecting the ripper imaging unit 46 and the lower end portion of the shank 51. Alternatively, ripper imaging units 46 may be disposed below both the first downward protruding portion 65 and the second downward protruding portion 66.

As illustrated in FIG. 6, the work vehicle 1 includes a vehicle control unit 24 and a communication unit 25. The communication unit 25 is connected to an antenna (not illustrated) mounted on the vehicle body 2. The communication unit 25 carries out wireless communication with a communication unit 27 of a remote operating device 26. For example, the remote operating device 26 is disposed inside a management center away from the work site where the work vehicle 1 is being used. Alternatively, the remote operating device 26 may be portable and may be disposed at the work site.

The vehicle control unit 24 is configured with a computation device such as a CPU, and a memory such as a RAM or a ROM or with a storage device such as a hard disk. The vehicle control unit 24 is programmed to control the work vehicle 1 based on operation signals from the remote operating device 26. Moreover, the vehicle control unit 24 acquires image data acquired by the imaging unit 23 via wires or wirelessly. The vehicle control unit 24 transmits the image data captured by the imaging unit 23 to the communication unit 27 of the remote operating device 26 via the communication unit 25.

The remote operating device 26 includes a remote control unit 28 and an operating unit 29. The remote control unit 28 is configured with a computation device such as a CPU, and a memory such as a RAM or a ROM or with a storage device such as a hard disk.

The operating member 29 is operated by an operator for driving the work vehicle 1. For example, the operating unit 29 includes an acceleration operating device for adjusting the output of the engine 11. The operating unit 29 includes a work implement operating device for operating the work implement 3. The operating unit 29 includes a ripper operating member for operating the ripper device 31. The operating unit 29 includes a steering operating device for changing the traveling direction of the work vehicle 1 to the right and left. The remote control unit 28 transmits operation signals indicating the operating contents from the operating unit 29 to the communication unit 25 of the work vehicle 1 via the communication unit 27.

The remote operating device 26 includes a display unit 30. The display unit 30 is configured with a display such as a CRT, and LCD, or an OELD. However, the display unit 30 is not limited to the aforementioned displays and may be another type of display.

The communication unit 27 of the remote operating device 26 receives the image data captured by the imaging unit 23 from the communication unit 25 of the work vehicle 1. The remote control unit 28 is programmed to display images indicating the surroundings of the work vehicle 1 on the display unit 30 based on the image data captured by the imaging unit 23. For example, the remote control unit 28 may synthesize a bird's-eye view image from the images captured by the imaging unit 23 and display the bird's-eye view image on the display unit 30. Alternatively, the remote control unit 28 may display each of the images captured by the imaging unit 23 on the display unit 30.

The operator operates the operating unit 29 while viewing the display images. As a result, the operation signals are transmitted from the communication unit 27 of the remote operating device 26 and the communication unit 25 of the work vehicle 1 receives the operation signals from the remote operating device 26. The vehicle control unit 24 controls the abovementioned engine 11, the pump displacement control unit 19, the work implement control valve 20, and the clutch control valve 22 and the like based on the operation signals. As a result, the operator is able to operate the work vehicle 1 remotely.

The rear end of the fuel tank 6 is positioned rearward of the rear ends of the crawler belts 4a and 4b in the work vehicle 1 (crawler belt-type tractor 1A) according to the present embodiment discussed above. Therefore, a crawler belt-type tractor can be provided in which the vehicle balance is good even when a work implement 3 (excavating blade) and a ripper device 31 are attached.

The LC attachment portion 203, the first TC attachment portion 201, and the second TC attachment portion 202 overlap the fuel tank 6 as seen from above. Therefore, the lift cylinder 55, the first tilt cylinder 53, and the second tilt cylinder 54 do not need to be disposed to the rear even in a configuration in which the fuel tank 6 is pushed out to the rear. As a result, the work positions of the ripper device 31 can be similar to those of a work vehicle in which the fuel tank 6 is not pushed out to the rear.

The LC attachment portion 203 is positioned forward of the first TC attachment portion 201 and the second TC attachment portion 202. According to this configuration, the LC attachment portion 203 is moved forward and the first tilt cylinder 53 and the second tilt cylinder 54 are moved rearward whereby the work positions of the ripper device 31 can be matched to predetermined positions. As a result, the degree of recession upward of the second recessed portion 63 and the third recessed portion 64 can be reduced and thus the capacity of the fuel tank 6 can be increased.

Further, the first tilt cylinder 53 and the second tilt cylinder 54 are moved to the rear whereby the first tilt cylinder 53 and the second tilt cylinder 54 can be disposed while inclined to the rear and upward. Furthermore, the lift cylinder 55 can be inclined to the rear and upward during ripper work due to the LC attachment portion 203 being attached further toward the front. At this time, the force for ripping obtained from the lift cylinder 55 during ripper work can be increased in comparison to when the lift cylinder 55 is horizontal during ripper work.

The fuel tank 6 includes the first recessed portion 62, the second recessed portion 63, and the third recessed portion 64 which are portions cut out for the respective ranges of movement of the lift cylinder 55, the first tilt cylinder 53, and the second tilt cylinder 54. The degrees of recession upward of the first recessed portion 62, the second recessed portion 63, and the third recessed portion 64 increase further toward the rear. Consequently, the ranges of movement of the lift cylinder 55, the first tilt cylinder 53, and the second tilt cylinder 54 can be made large. In particular, workability is improved when the work vehicle 1 is performing work on uneven ground.

The work vehicle 1 (crawler belt-type tractor 1A) further includes the ripper imaging unit 46 that is able to capture images of the work positions (positions near the ripper point 57) of the ripper device 31. The ripper imaging unit 46 is attached to the outer surface of the vehicle body 2 below the fuel tank 6 and joined to the outer surface of the fuel tank 6. In the present embodiment, because the rear end of the fuel tank 6 is positioned rearward of the rear ends of the crawler belts 4a and 4b, the fuel tank 6 has a shape that is pushed out to the rear further than a normal bulldozer. Therefore, it is difficult for an operator inside the operator cab to view the work positions of the ripper device 31 when the operator cab is disposed in front of the fuel tank 6. However, the operator is able to check the work positions of the ripper device 31 by viewing the images captured by the ripper imaging unit 46 even though the fuel tank 6 has the aforementioned shape.

The fuel tank 6 includes at least one of the first downward protruding portion 65 that is positioned further to the outside than the second recessed portion 63 and protrudes downward from the second recessed portion 63, and the second downward protruding portion 66 that is positioned further to the outside than the third recessed portion 64 and protrudes downward from the third recessed portion 64. The ripper imaging unit 46 is disposed below at least one of the first downward protruding portion 65 and the second downward protruding portion 66. As a result, the ripper imaging unit 46 is not positioned higher than any of the lift cylinder 55, the first tilt cylinder 53, and the second tilt cylinder 54. As a result, it is difficult for the lift cylinder 55, the first tilt cylinder 53, and the second tilt cylinder 54 to be shown in the images captured by the ripper imaging unit 46. Therefore, the possibility that the ripper point 57 is hidden by the lift cylinder 55, the first tilt cylinder 53, and/or the second tilt cylinder 54 in the images is reduced. Consequently, the operator can easily check the work positions of the ripper device 31.

The ripper imaging unit 46 is positioned lower than at least one of the LC attachment portion 203, the first TC attachment portion 201, and the second TC attachment portion 202. As a result, it is even more difficult for the lift cylinder 55, the first tilt cylinder 53, and the second tilt cylinder 54 to be shown in the images captured by the ripper imaging unit 46. Consequently, the operator can more easily check the work positions of the ripper device 31.

Although the embodiment of the present invention has been described so far, the present invention is not limited to the above embodiment and various modifications may be made within the scope of the invention.

The work vehicle 1 (crawler belt-type tractor 1A) is not limited to a remotely operated vehicle and may be a manned work vehicle. Alternatively, an operator cab may be provided on the vehicle body 2 in the same way as a manned work vehicle and a device that is the same as the remote operating device 26 may be provided inside the operator cab. Consequently, the operator is able to easily operate the work vehicle 1 while viewing the display images.

The number of the surroundings imaging units 40 is not limited to four and may be three or less or five or more. The dispositions of each of the imaging devices of the surroundings imaging unit 40 are not limited to the dispositions indicated in the above embodiments and may be disposed differently. The front imaging unit 41 may be attached to another portion and is not limited to the supporting member 33. For example, the front imaging unit 41 may be attached to the vehicle body 2.

The number of the work implement imaging units 45 is not limited to one and may be two or more. The disposition of the work implement imaging unit 45 is not limited to the disposition indicated in the above embodiment and may be disposed differently. The number of the ripper imaging units 46 is not limited to one and may be two or more. The disposition of the ripper imaging unit 46 is not limited to the disposition indicated in the above embodiment and may be disposed differently.

The fuel tank 6 may not include the downward protruding portion to which the ripper imaging unit 46 is not attached among the first downward protruding portion 65 and the second downward protruding portion 66.

The imaging units other than the rear imaging unit 44 may be omitted. For example, an operator's seat may be provided on the vehicle body 2 and the operator may perform the operations while visually checking the front, the left, and the right of the vehicle. In this case, the operator may be able to check the images captured by the rear imaging unit 44 with the display unit 30 disposed at the operator's seat. In this case, the supporting member 33 may be omitted.

INDUSTRIAL APPLICABILITY

According to the present invention, a crawler belt-type tractor with a good vehicle balance when work implements are attached to the vehicle front and rear can be provided.

The invention claimed is:

1. A tractor comprising:
a vehicle body;
a travel device attached to the vehicle body, the travel device including a crawler belt;
an engine generating driving power to drive the travel device;
a fuel tank disposed in a rear portion of the vehicle body, the fuel tank storing fuel for the engine, a rear end of the fuel tank being positioned rearward of a rear end of the crawler belt; and
a first hydraulic cylinder attachment portion disposed on the rear portion of the vehicle body, the first hydraulic cylinder attachment portion overlapping the fuel tank as seen from above.

2. The tractor according to claim 1, wherein
the first hydraulic cylinder attachment portion overlaps the fuel tank as seen from a side.

3. The tractor according to claim 1, wherein
the fuel tank includes a first recessed portion cut out for a range of movement of a first hydraulic cylinder, and
a degree of recession of the first recessed portion becomes larger toward rearward.

4. The tractor according to claim 1, wherein
the fuel tank has a shape that extends from one end to another end in a vehicle width direction of the vehicle body.

5. The tractor according to claim 1, further comprising
an excavating blade disposed on a front side of the engine.

6. A tractor comprising:
a vehicle body;
a travel device attached to the vehicle body, the travel device including a crawler belt;
an engine generating driving power to drive the travel device;
a fuel tank disposed in a rear portion of the vehicle body, the fuel tank storing fuel for the engine, a rear end of the fuel tank being positioned rearward of a rear end of the crawler belt;
a first hydraulic cylinder attachment portion; and
a second hydraulic cylinder attachment portion,
the first hydraulic cylinder attachment portion and the second hydraulic cylinder attachment portion overlapping the fuel tank as seen from above.

7. The tractor according to claim 6, wherein
the second hydraulic cylinder attachment portion overlaps the fuel tank as seen from a side.

8. The tractor according to claim 6, wherein
the first hydraulic cylinder attachment portion is positioned forward of the second hydraulic cylinder attachment portion.

9. The tractor according to claim 6, further comprising
a third hydraulic cylinder attachment portion,
the second hydraulic cylinder attachment portion and the third hydraulic cylinder attachment portion being disposed in positions symmetrical to a center axial line of the first hydraulic cylinder as seen from above, and
the third hydraulic cylinder attachment portion overlapping the fuel tank as seen from above.

10. The tractor according to claim 9, wherein
the third hydraulic cylinder attachment portion overlaps the fuel tank as seen from a side.

11. The tractor according to claim 9, further comprising
a ripper device attached to a rear side of the vehicle body, the ripper device including a first hydraulic cylinder to perform lifting actions and second and third hydraulic cylinders to perform tilting actions.

12. The tractor according to claim 11, further comprising
a ripper imaging unit configured to capture an image of a work position of the ripper device,
the ripper imaging unit being provided on the rear side of the vehicle body.

13. The tractor according to claim 12, wherein
the ripper imaging unit is positioned lower than at least one of the first hydraulic cylinder attachment portion, the second hydraulic cylinder attachment portion, and the third hydraulic cylinder attachment portion.

14. The tractor according to claim 9, wherein
the fuel tank includes a third recessed portion cut out for a range of movement of a third hydraulic cylinder, and
a degree of recession of the third recessed portion becomes larger toward rearward.

15. The tractor according to claim 9, wherein
the fuel tank includes
  a first recessed portion which is a portion cut out for a range of movement of a first hydraulic cylinder,
  a second recessed portion which is portion cut out for a range of movement of a second hydraulic cylinder,
  a third recessed portion which is a portion cut out for a range of movement of a third hydraulic cylinder,
  a first downward protruding portion, and
  a second downward protruding portion,
  degrees of recession of the first recessed portion, the second recessed portion, and third recessed portion become larger toward rearward,
  the first recessed portion is provided in a center in a left-right direction of the fuel tank,
  the second recessed portion and the third recessed portion are provided adjacent to the first recessed portion,
  the first downward protruding portion is positioned outward of the second recessed portion and protruding downward from the second recessed portion, and
  the second downward protruding portion is positioned outward of the third recessed portion and protruding downward from the third recessed portion.

16. The tractor according to claim 6, wherein
the fuel tank includes a second recessed portion cut out for a range of movement of a second hydraulic cylinder, and
a degree of recession of the second recessed portion becomes larger toward rearward.

* * * * *